(12) United States Patent
Gaspary et al.

(10) Patent No.: US 6,840,191 B2
(45) Date of Patent: Jan. 11, 2005

(54) DEVICE FOR RECEIVING ANIMAL FOOD

(76) Inventors: Dietrich Gaspary, Ellwanger Str. 21, D-89522 Heidenheim (DE); Raimund Moessmer, Forststrasse 19, D-82065 Baierbrunn (DE)

( * ) Notice: Subject to any disclaimer, the term of this patent is extended or adjusted under 35 U.S.C. 154(b) by 0 days.

(21) Appl. No.: 10/311,137
(22) PCT Filed: Jun. 15, 2001
(86) PCT No.: PCT/EP01/06737
§ 371 (c)(1), (2), (4) Date: Feb. 24, 2003
(87) PCT Pub. No.: WO01/95704
PCT Pub. Date: Dec. 20, 2001

(65) Prior Publication Data
US 2004/0016408 A1 Jan. 29, 2004

(30) Foreign Application Priority Data
Jun. 15, 2000 (DE) .................................. 200 10 402 U

(51) Int. Cl.⁷ .............................................. A01K 5/01
(52) U.S. Cl. .................................... 119/61.5; 119/61.55
(58) Field of Search ....................... 119/61, 51.5, 51.01, 119/52.1, 54, 72, 74, 61.5, 61.51, 61.53, 61.54, 61.55, 61.56; 220/23.87, 23.88, 23.89, 23.9, 23.91

(56) References Cited

U.S. PATENT DOCUMENTS

| | | | |
|---|---|---|---|
| 2,588,727 A | 3/1952 | Howard | 65/15 |
| 3,527,192 A | 9/1970 | Ferrara | 119/61 |
| 3,698,597 A | * 10/1972 | Burke | 220/86.2 |
| 3,991,719 A | * 11/1976 | Bruce | 119/61 |
| 4,182,462 A | * 1/1980 | Buff, Jr. | 220/495.03 |
| 4,270,490 A | * 6/1981 | Kopp | 119/61 |
| 5,031,575 A | 7/1991 | Phillips | 119/61 |
| 5,069,166 A | * 12/1991 | Ahuna | 119/61 |
| 5,709,168 A | 1/1998 | Walker | 119/61 |
| 5,782,374 A | 7/1998 | Walker | 220/404 |
| 6,089,187 A | 7/2000 | Gaspary | 119/61 |
| 6,112,698 A | * 9/2000 | Zelinger | 119/61 |
| 6,401,955 B1 | * 6/2002 | Yang | 220/23.87 |

* cited by examiner

Primary Examiner—Yvonne R. Abbott
(74) Attorney, Agent, or Firm—Davis & Bujold, P.L.L.C.

(57) ABSTRACT

The invention relates to a device for receiving animal food, especially pet food, comprising a base element (1) with a bowl-shaped cavity (2) which is used to accommodate the animal food (2) and is defined by the bottom (1a) of the base and at least one side wall (3) of the base; also comprising a bowl-shaped insert element (4) which can be introduced into the base element and which is provided with a bottom (5) which matches in an at least approximate manner the bottom element of the base, in addition to being provided with at least one side wall (6) and an upper opening (2). The base element and the insert element or a part of the wall joined to the insert part have different wall angles. As a result the insert element (4) is clamped when inserted into the base element (1).

18 Claims, 3 Drawing Sheets

DEVICE FOR RECEIVING ANIMAL FOOD

The invention relates to a device for receiving animal food, in particular food for domestic animals, having a bottom part which, for receiving the animal food, has a bowl-like cavity which is bounded by a bottom base and at least one bottom side wall, and having a bowl-like insert part which can be introduced into the bottom part and has an insert base, which is adapted at least more or less to the bottom base part, at least one side wall and an upper opening.

A device of this type is described in EP 0 896 790 A2.

The purpose of the known device mentioned above is to provide a device which is intended for receiving animal food and, as a result of inserts in the form of disposal or single-use inserts, is easy to handle, in particular to clean, since contamination of the bottom part is avoided and, in this way, the device is considerably more hygienic than the known devices for receiving animal food.

In order that the insert part is accommodated securely in the bottom part and cannot be damaged or displaced as the animal is eating, the insert part is secured in the cavity by a separate fastening means following insertion. Somewhat disadvantageous in the case of the known device mentioned above, however, is the fact that the additional fastening device, although ensuring secure fastening of the insert part and thus considerably improving the use purpose and the handling of the device, constitutes a somewhat higher level of outlay.

For the further prior art, you are also referred to U.S. Pat. No. 5,709,168, U.S. Pat. No. 5,782,374 and U.S. Pat. No. 5,031,575, which likewise have separate fastening means and/or fastening elements for securing the insert part and/or positioning the same.

U.S. Pat. No. 3,527,192 discloses a device with an air gap between the base of the insert part and the base of the bottom part, the intention being for the insert part to be secured in the cavity by friction.

It is an object of the present invention to improve the device of the generic type further, in particular to provide for straightforward positioning and/or fastening of the insert part in the cavity of the bottom part and straightforward connection between the insert part and the bottom part, to be precise without additional measures or fastening elements.

This object is achieved according to the invention in that the bottom side wall and the insert side wall or one or more wall parts connected to the insert side wall have different wall angles, at least in the initial state, such that the insert part, once inserted into the bottom part, is retained by clamping.

The inventors have found, surprisingly, that, with different wall angles being formed, it is possible for the insert part to be clamped such that it is accommodated securely in the cavity and connected securely to the bottom part.

The different wall angles may be realized both on the inside and on the outside.

Provision may thus be made, for example, for the insert side wall to be provided with at least one wall part which extends downward from the upper opening along the outside of the bottom side wall, the different wall angles being formed between the wall part and the outside of the bottom side wall.

For the sake of simplicity, reference will, be made to bottom wall part and insert wall part at all times hereinbelow. In the case where the bottom part and wall part are of circular or oval design, a circumferential wall is present. In the case of the device being of angular configuration, e.g. of square or polygonal shape, the entire side wall is formed in each case by corresponding side-wall parts which are predetermined by the shape of the bottom part and thus also of the insert part.

In the case of a non-circular shape, the same applies here for the expression "at least one wall part", i.e., if the insert part is non-circular and angular, a plurality of wall parts are correspondingly present.

Of course, in order to achieve a sufficiently pronounced clamping action, the insert side wall or the wall part connected to the insert side wall should have corresponding elasticity.

In an advantageous configuration of the invention, provision may be made for the at least one wall part to butt, at its lower end, against the outside of the bottom side wall. This achieves a very high level of clamping action.

In a further, very advantageous configuration, provision may be made for the transition between the insert side wall and the at least one wall part to form a bearing means on the bottom part. This additionally provides a defined position for the insert part.

A further increase in the clamping action and thus in stable positioning of the clamping part in the cavity is achieved if provision is made for a spacing to be provided between the inside of the at least one wall part and the outside of the bottom side wall in the region of the transition between the insert side wall and the at least one wall part.

This configuration makes it possible to achieve very good resilient action for the projecting wall part or parts. In this case, optimum clamping action is achieved in the lower region or in the end region of the wall parts by corresponding abutment against the outside of the bottom side wall. If a material with sufficient elasticity is used for the wall part, the object according to the invention is achieved extremely straightforwardly in the case of this configuration.

Although an extremely wide range of differences in angle are possible in practice, in dependence on the material used for the insert part and on the elasticity thereof, the differences in wall angle between the insert part and the bottom part, in practice, should really be between 1° and 5°, preferably between 2° and 3°.

Values below 1 mm, preferably between 0.4 mm and 0.6 mm, have been found to be sufficient as the wall thickness for the insert part.

In a very advantageous configuration of the invention, the insert part will be produced from recyclable material. foodstuff compatibility should also be ensured. Particularly suitable materials for this purpose are fibrous materials, cellulose materials and starch, e.g. potato starch or corn starch. Examples of possible fibrous materials are paperboard and cardboard, in which case all that is necessary is to ensure that there is sufficient elasticity in order to provide the clamping action Exemplary embodiments of the invention are described in principle hereinbelow with reference to the drawing, in which:

Figure 1:
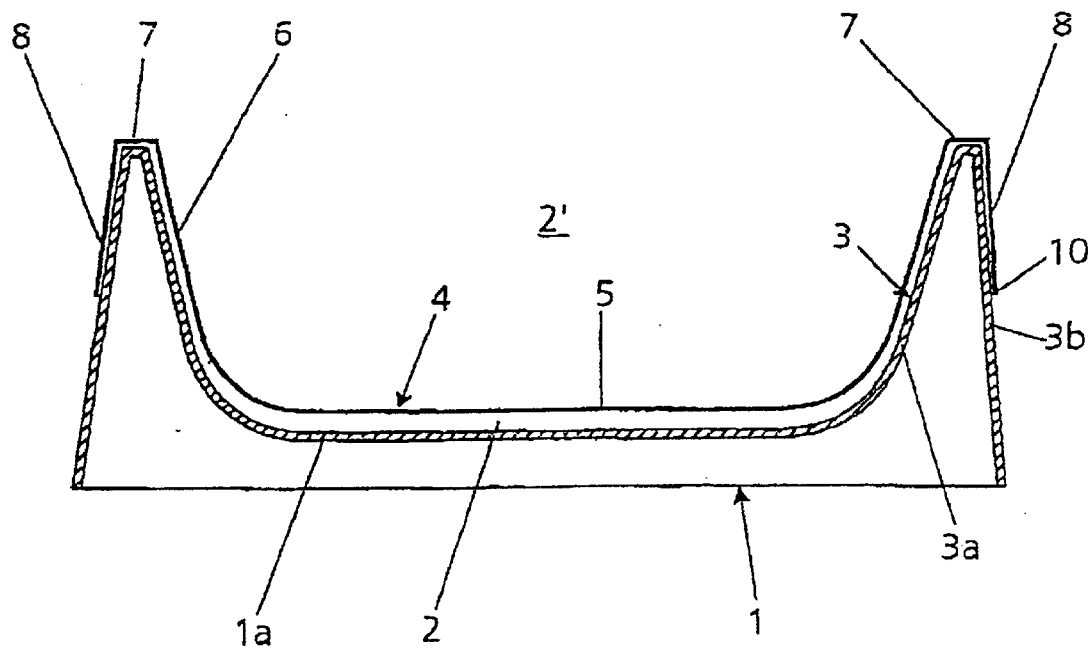
FIG. 1 shows a vertical section through the device according to the invention with the bottom part and the insert part.

As can be seen from FIG. 1, the bottom part 1 has a bottom base 1a and a bottom side wall 3, which define a bowl-like cavity 2. The bottom part 1 is of hollow design, the bottom side wall 3 being formed by an inner side-wall part 3a and an outer side-wall part 3b, which is spaced apart from the inner side-wall part. As can be seen, the bottom part 1 is in the form of a truncated cone, the truncated cone tapering in the upward direction, while the cavity 2 widens in the upward direction Inserted into the cavity 2 of the bottom part 1 is an insert part 4 which has an insert base 5 and an encircling insert side wall 6. The profile of the insert base 5 and of the insert side wall 6 corresponds, in terms of angle and shape, to the bottom base 1a and the bottom side wall 3a. The insert part 4 has an upper opening and likewise has a cavity 2', which is adapted to the cavity 2 of the bottom part 1. The upper end of the insert side wall 6 is angled outwards and thus forms a bearing means 7. The bearing means 7 is adjoined by a downwardly extending wall part 8. As can be seen from the enlarged illustration of FIG. 2, it is possible for the bearing means 7 to rest on the upper side of the bottom part 1, as a result of which a defined bearing surface is provided and the situation where the insert part 4 is forced out of the cavity 2, e.g. by the muzzle of an animal as it is eating, is prevented.

Figure 2:
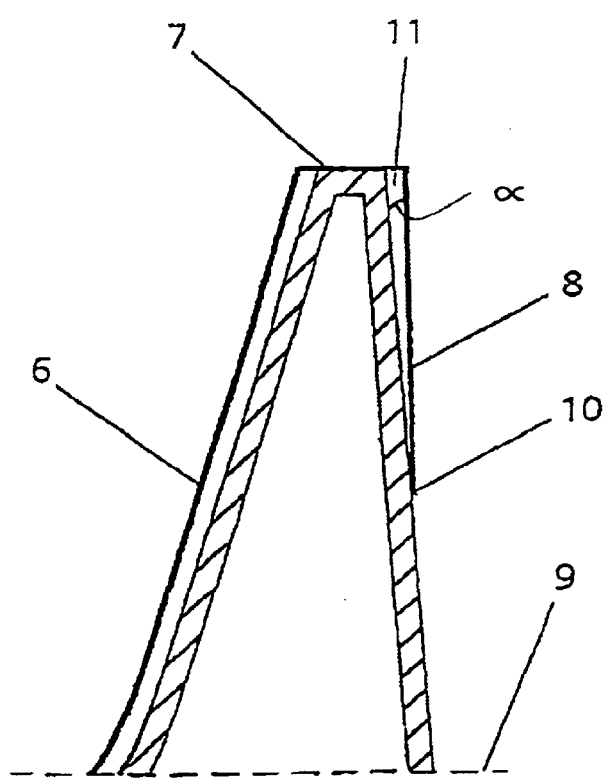
FIG. 2 shows an enlarged detail of the section according to FIG. 1 in the side-wall part.

As can also be seen from the enlarged illustration of FIG. 2, the encircling wall part 8 has a slope or a wall angle $\alpha$ which deviates slightly from the wall angle of the outside wall 3b of the bottom part 1. The deviation may be approximately 2°. As can be seen, the wall angle $\alpha$ of the wall part 8 in relation to the horizontal plane 9 is smaller than the angle of the outer bottom side wall 3b in relation to said plane.

If the wall part 8 is of correspondingly elastic design, this results, with an appropriate selection of diameter, in a clamping action in relation to the outer bottom wall part 3b at the lower end 10 of said wall part, in which case the insert part 4 is retained securely in the cavity 2. This clamping action is further improved if, in the upper region of the wall part 8 and/or in the region of the bearings 7, there is a radial spacing 11 between the inside of the wall part 8 and the outside of the outer bottom side wall 3b. This spacing may advantageously be, for example, a few millimeters, e.g. 1 mm to 3 mm.

The different wall angles may be between 1° and 5°, preferably between 2° and 3°.

The wall thickness of the wall part 8 and also the insert part 4 may be below 1 mm, preferably 0.4 mm to 0.6 mm.

It is possible for the wall part 8, in extension of the encircling side wall 6 and of the bearing means 7, likewise to be of encircling design. However, it is, of course, also possible for just individual, circumferentially distributed wall parts 8 in the form of lugs, extending from the bearing means 7, to enclose the outer bottom side wall 3b on the outside in order to achieve the clamping action.

Figure 3:
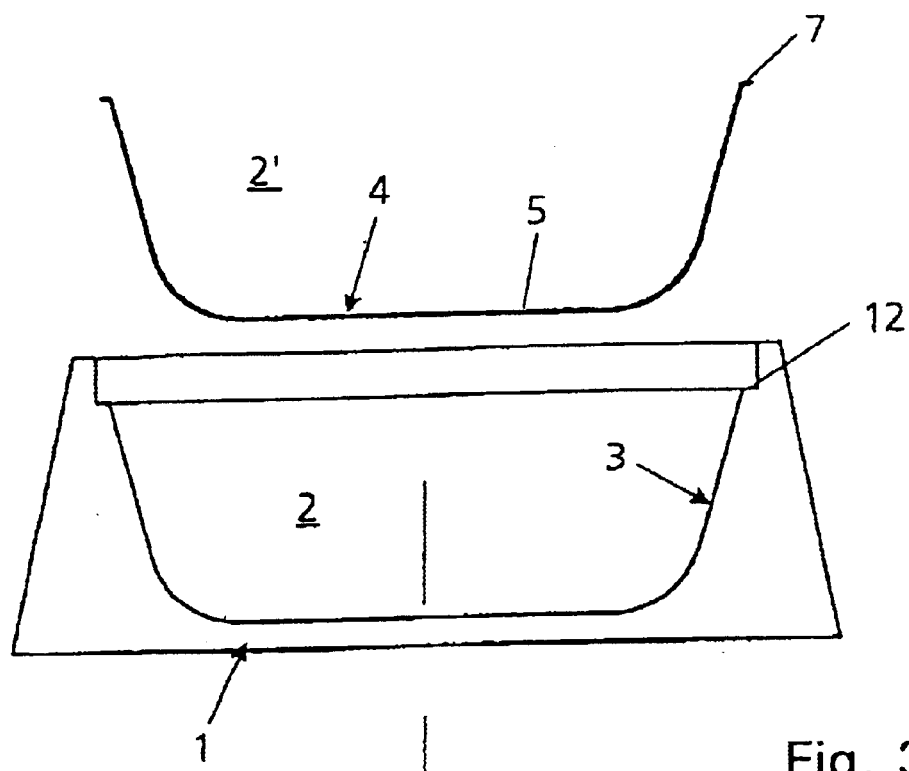
FIG. 3 shows a further configuration of the device according to the invention with an insert part prior to insertion into the bottom part.
Figure 4:
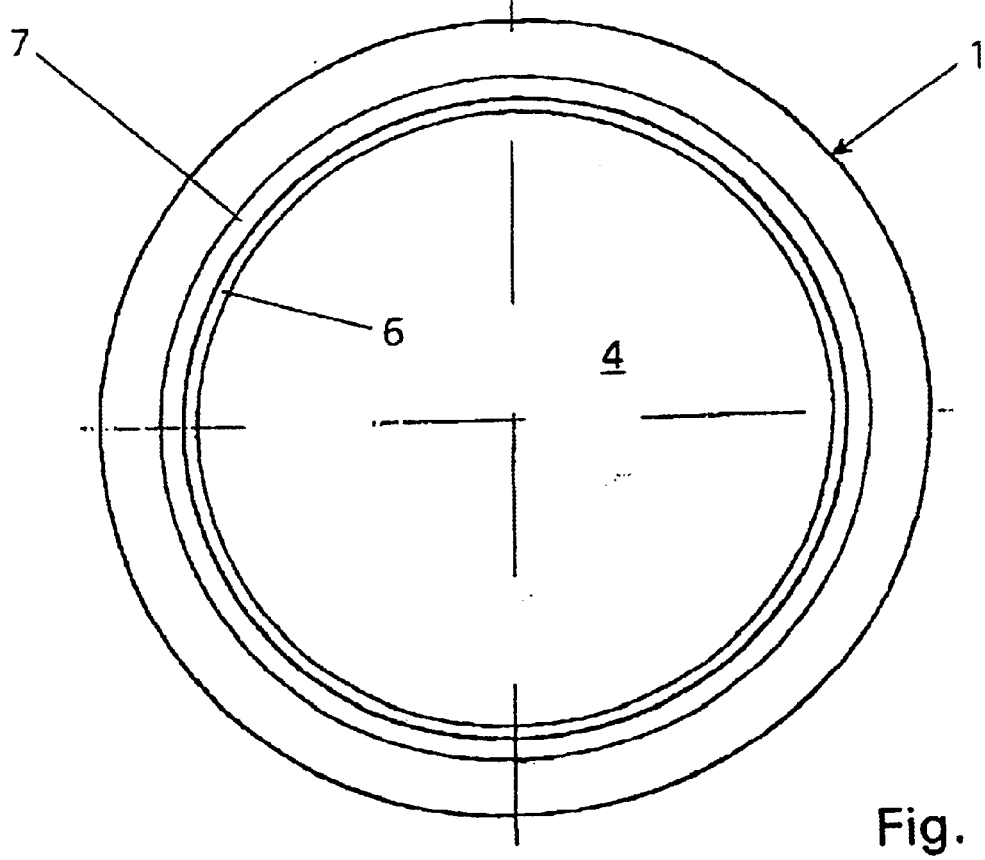
FIG. 4 shows a plan view of FIG. 3.

In addition to using cellulose or starch as the material for the insert part 4, a foodstuff-compatible plastic, which should be recyclable or biodegradable, is, of course, also possible if required FIGS. 3 and 4 illustrate an embodiment of the invention in which, instead of the wall part 8 engaging around the outer bottom side wall 3b, only a short bearing means 7 is provided on the upper side of the insert part 4, said short bearing means resting on a shoulder 12 of the inner side wall 3a of the bottom part 1. A clamping action is formed here by different wall angles between the insert side wall and the inner bottom side wall 3a. By virtue of the shoulder 12, on which the bearing means 7 rests, the insert part 4 is likewise positioned reliably in the cavity 2 of the bottom part 1.

Figure 5:
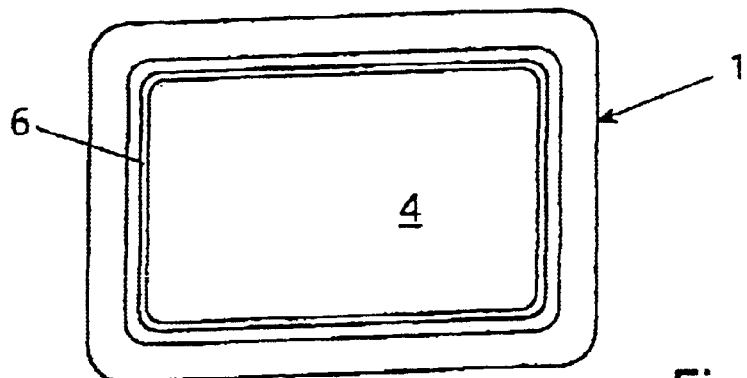
FIGS. 5 to 7 show different shapes for the device.

FIG. 5 shows a rectangular shape as an alternative to the round bowl shape of the device according to FIGS. 1 to 4. A square shape is, of course, also possible. In this case, four insert side-wall parts 6 and a corresponding number of bottom side-wall parts 3 are correspondingly present.

Figure 6:
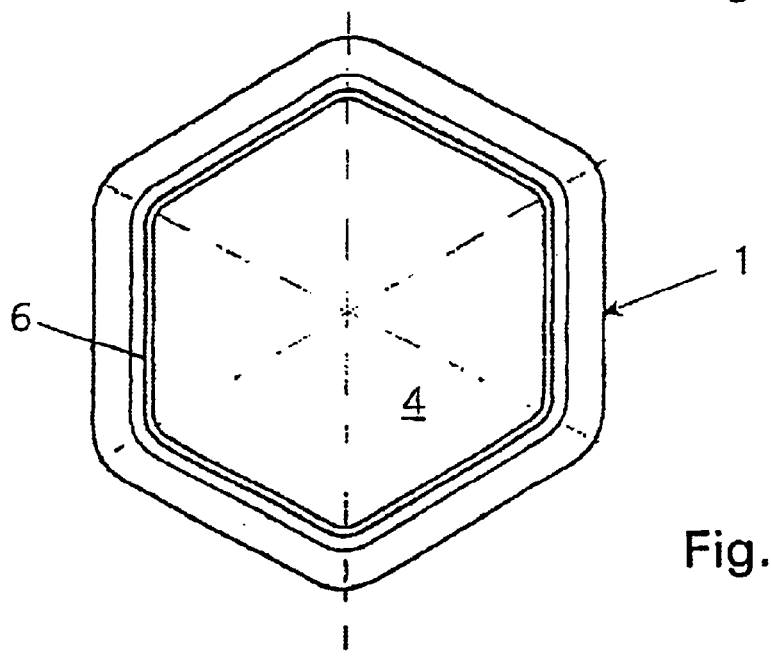

FIG. 6 shows a hexagonal shape of the device in plan view, six side-wall parts and, if appropriate, also six wall parts 8 correspondingly being provided in this case.

Figure 7:
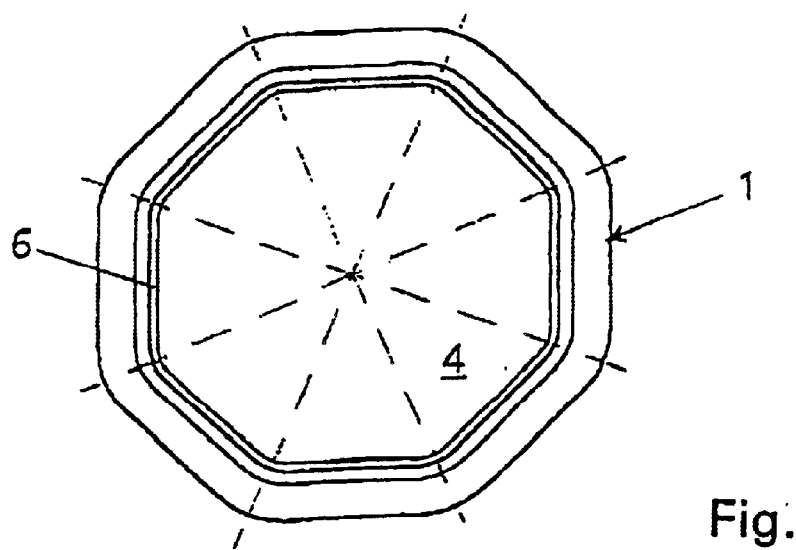

FIG. 7 shows a device of rounded octagonal shape, it also being the case here that a corresponding number of side-wall parts 3 and 6 and wall parts 8 have to be provided.

What is claimed is:

1. A device for receiving animal food, in particular food for domestic animals, having a bottom part which, for receiving the animal food, has a bowl-like cavity which is bounded by a bottom base and a least one bottom side wall, and having a bowl-like insert part which can be introduced into the bottom part and has an insert base, which is adapted at least more or less to the bottom base part, at least one side wall and an upper opening, wherein the bottom side wall (3) and the insert side wall (6) or one or more wall parts connected to the insert side wall (6) have a difference in wall angles, at least in the initial state, such that the insert part (4), once inserted into the bottom part (1), is retained by clamping; and the insert part (4) is formed from starch.

2. The device as claimed in claim 1, wherein the insert side wall (6) is provided with at least one wall part (8) which extends downward from the upper opening along the outside of the bottom side wall (3), the difference in wall angle being formed between the wall part (8) and the outside of the bottom side wall (3).

3. The device as claimed in claim 2, wherein the at least one wall part (8) is of at least partially elastic design.

4. The device as claimed in claim 2, wherein the at least one wall part (8) butts, at its lower end, against the outside of the bottom side wall (3).

5. The device is claimed in claim 2, wherein the transition between the insert side wall (6) and the at least one wall part (8) forms a bearing means (7) on the bottom part (1).

6. The device as claimed in claim 2, wherein a spacing (11) is provided between the inside of the at least one wall part (8) and the outside of the bottom side wall (3) in the region of the transition between the insert side wall (6) and the at least one wall part (8).

7. The device as claimed in claim 1, wherein the difference in wall angles is formed between the insert side wall (6) and an outside of the bottom side wall (3).

8. The device as claimed in claim 7, wherein the insert side wall (6) is of at least partially elastic design.

9. The device as claimed in claim 1, wherein the difference in wall angle is between 1° and 5°.

10. The device as claimed in claim 1, wherein the difference in wall angle is between 2° and 3°.

11. The device as claimed in claim 1, wherein the wall thickness of the insert part (4) and/or of the at least one wall part (8) connected to the insert side wall (6) is less than 1 mm.

12. The device as claimed in claim 11, wherein the wall thickness is between 0.4 mm and 0.6 mm.

13. The device as claimed in claim 1, wherein the bottom part (1) is at least more or less in the form of a truncated cone.

14. The device as claimed in claim 1, wherein the bottom part (1) is of square, oval or polygonal shape.

15. The device as claimed in claim 1, wherein the insert part (4) is formed from biodegradable material.

16. The device as claimed in claim 1, wherein the insert part (4) consists of cellulose material.

17. The device as claimed in claim 1, wherein the bottom side wall (3) is provided, in the upper region of its inside, with a shoulder (12) on which the insert part (4) rests by way of a horizontal bearing means (7).

18. The device as claimed in claim 17, wherein the shoulder (12) is designed as an encircling annular shoulder.

* * * * *